(12) United States Patent
Ide et al.

(10) Patent No.: US 7,346,803 B2
(45) Date of Patent: Mar. 18, 2008

(54) ANOMALY DETECTION

(75) Inventors: Tsuyoshi Ide, Kawasaki (JP);
Kunikazu Yoda, Yamato (JP); Hisashi Kashima, Yamato (JP); Hiroaki Etoh, Kanagawa-ken (JP); Ryo Hirade, Miura (JP)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 11/045,918

(22) Filed: Jan. 28, 2005

(65) Prior Publication Data
US 2005/0193281 A1    Sep. 1, 2005

(30) Foreign Application Priority Data
Jan. 30, 2004   (JP) .............................. 2004-023081

(51) Int. Cl.
*G06F 11/00* (2006.01)
(52) U.S. Cl. ............................................. 714/4; 714/38
(58) Field of Classification Search ..................... None
See application file for complete search history.

(56) References Cited

U.S. PATENT DOCUMENTS

| | | | | |
|---|---|---|---|---|
| 5,661,668 | A | * | 8/1997 | Yemini et al. .............. 702/186 |
| 7,107,491 | B2 | * | 9/2006 | Graichen et al. ............. 714/37 |
| 2004/0221190 | A1 | * | 11/2004 | Roletto et al. ................ 714/4 |
| 2007/0100875 | A1 | * | 5/2007 | Chi et al. ................... 707/102 |

OTHER PUBLICATIONS

Japanese Publication No. 2003-060704 published on Feb. 28, 2003.
Hajji, hassan, "Baselining Network Traffic and Online Faults Detection," IEEE International Conference on Communications 2003, vol. 1, pp. 301-308.

* cited by examiner

*Primary Examiner*—Christopher McCarthy
(74) *Attorney, Agent, or Firm*—Louis P. Herzberg

(57) ABSTRACT

A system such as a Web-based system in which a plurality of computers interact with each other is monitored to detect online an anomaly. Transactions of a service provided by each of a plurality of computers to another computer are collected, a matrix of correlations between nodes in the system is calculated from the transactions, and a feature vector representing a node activity balance is obtained from the matrix. The feature vector is monitored using a probability model to detect a transition to an anomalous state.

28 Claims, 9 Drawing Sheets

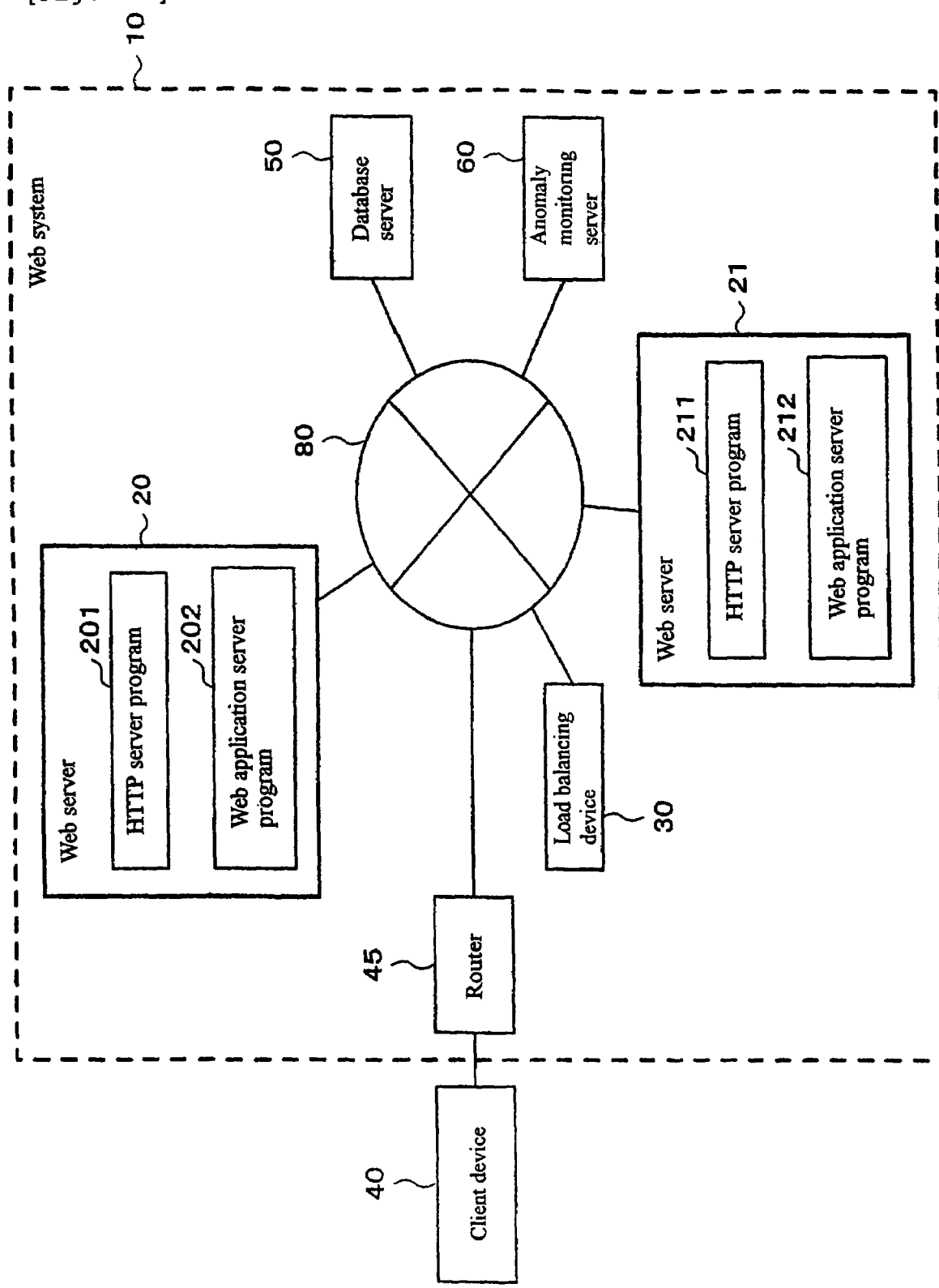
[Figure 1]

[Figure 2]
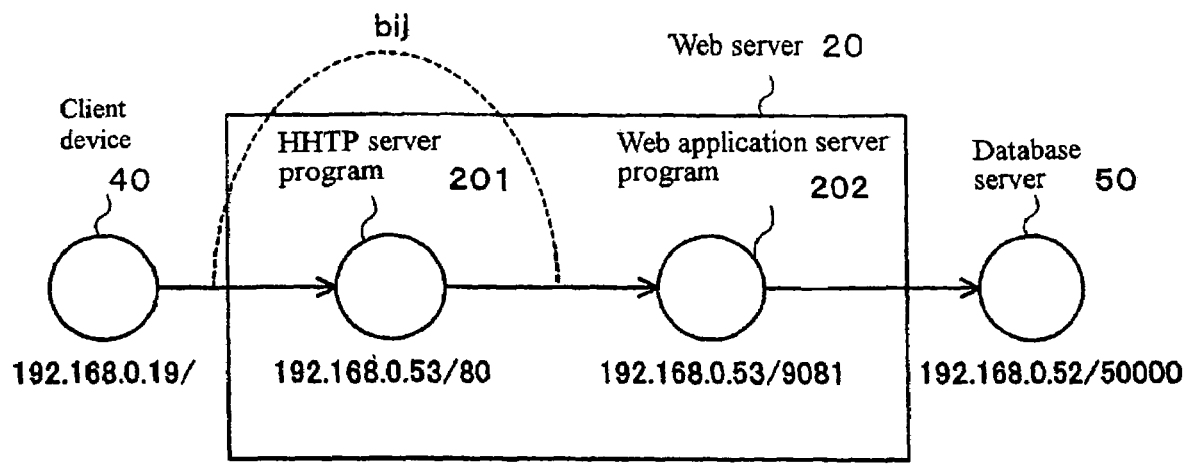
[Figure 3]
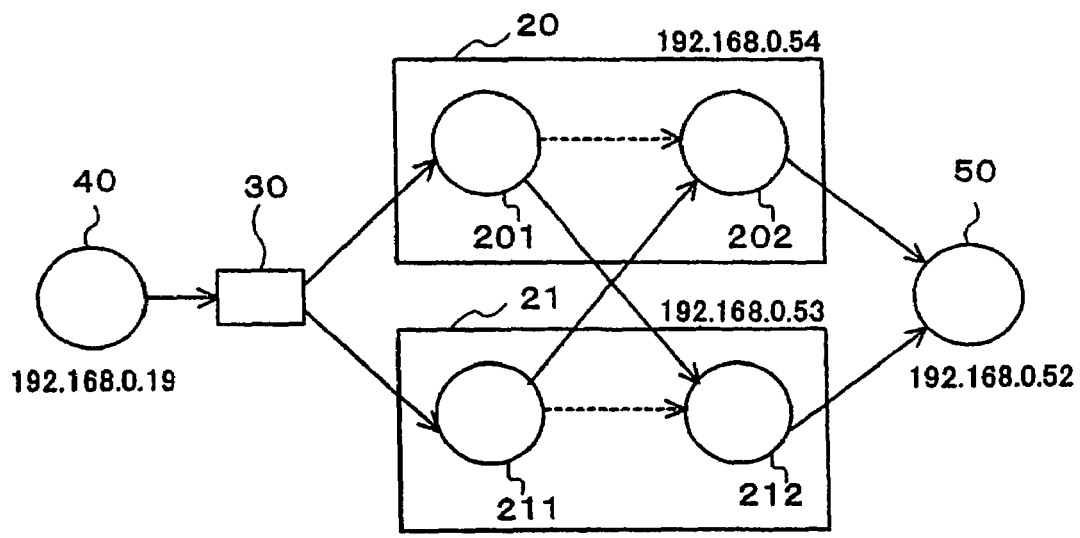

[Figure 4]
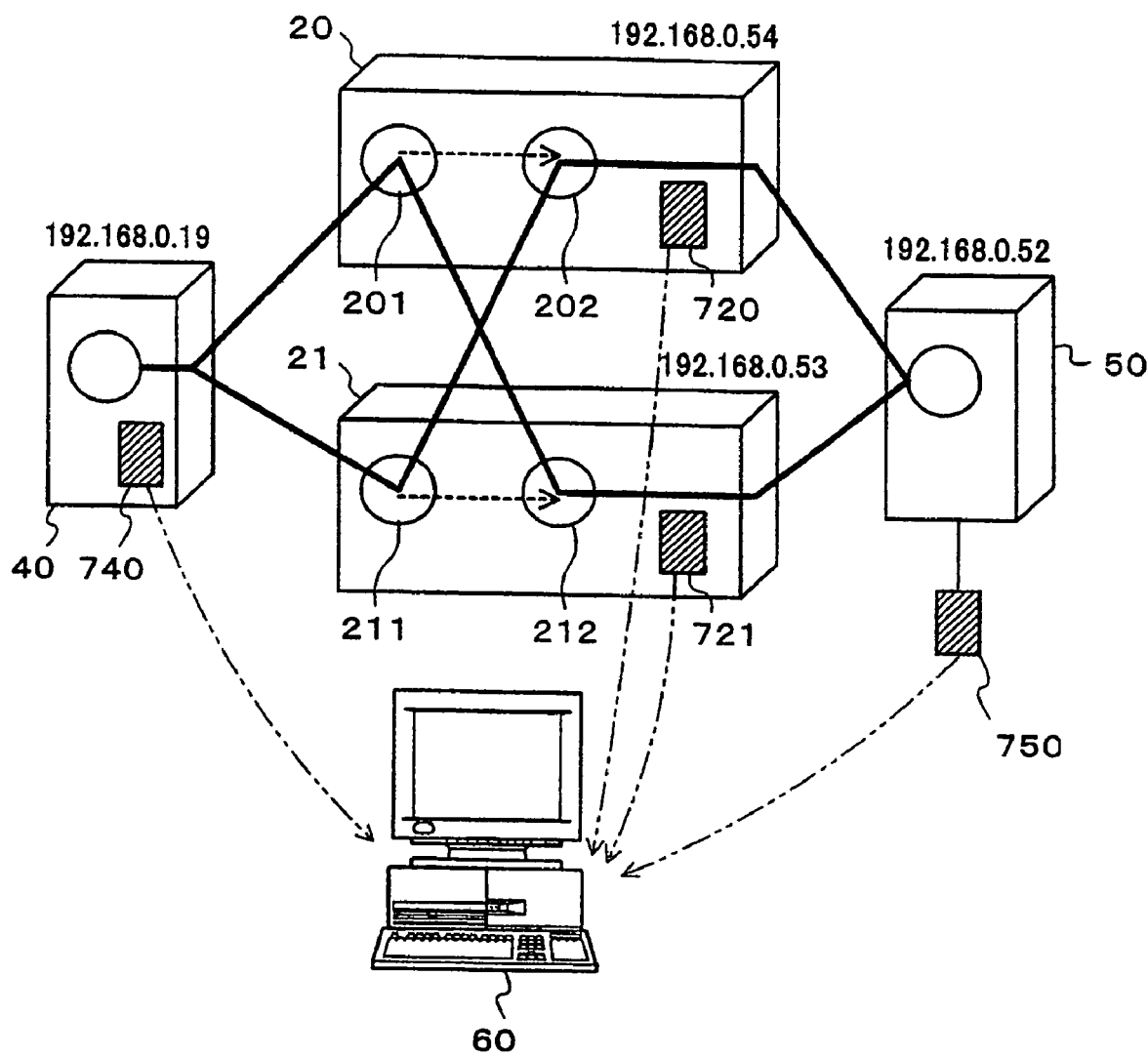

[Figure 5]
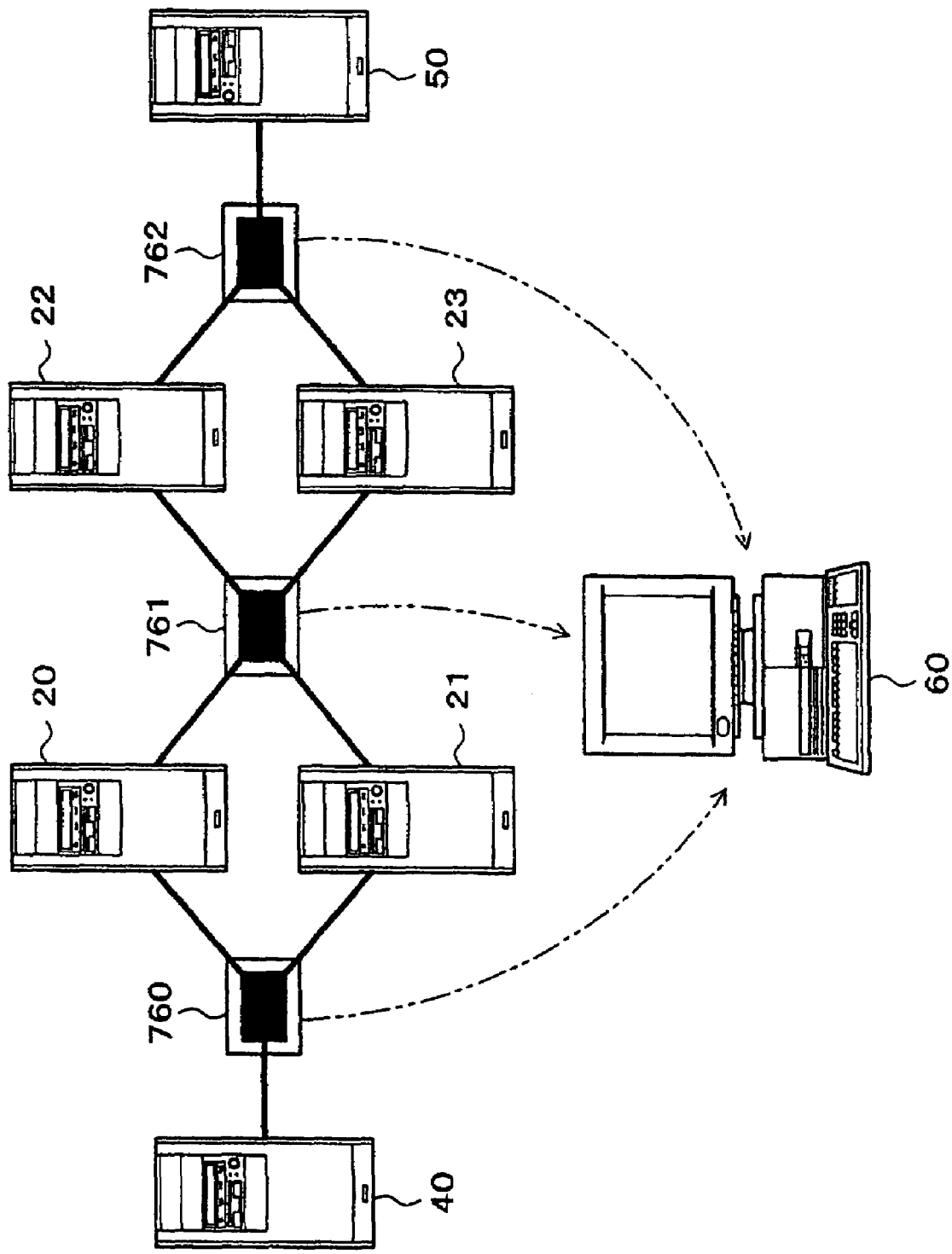

[Figure 6]
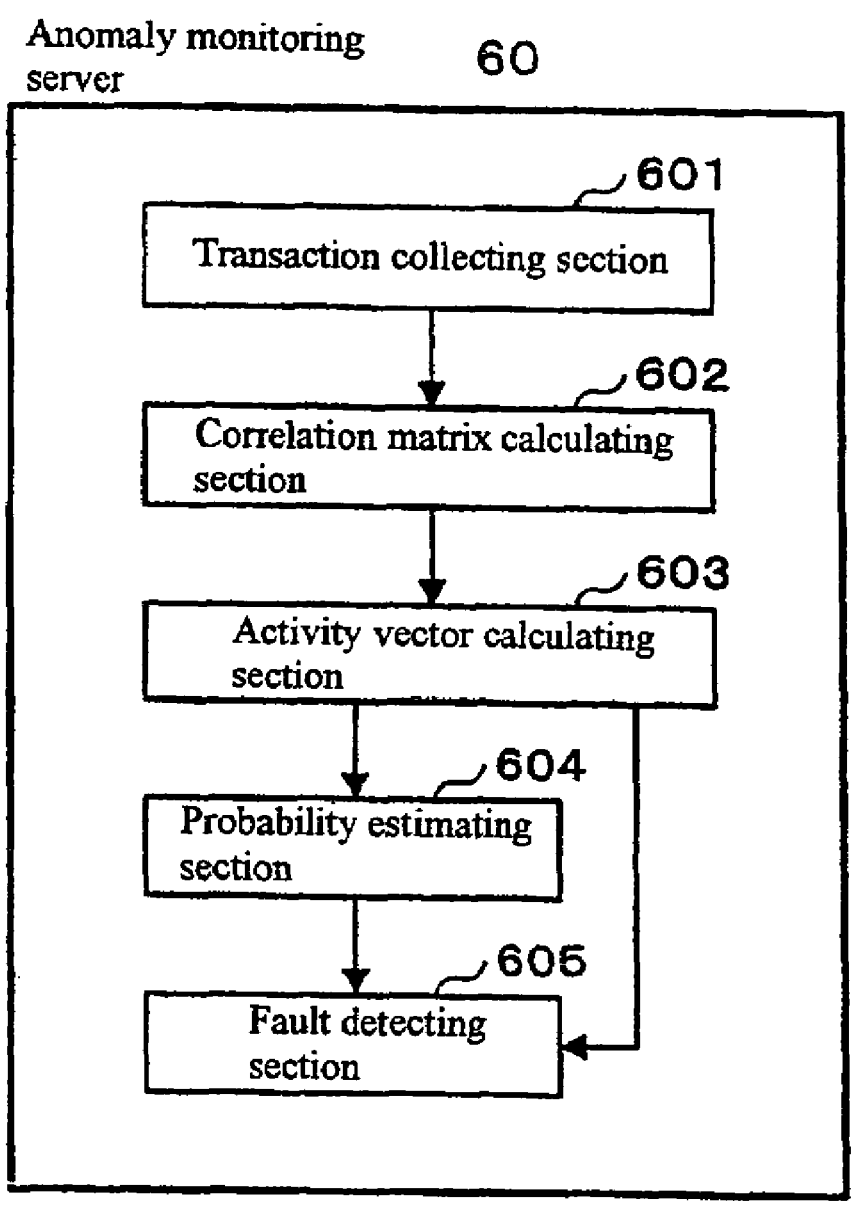

[Figure 7]
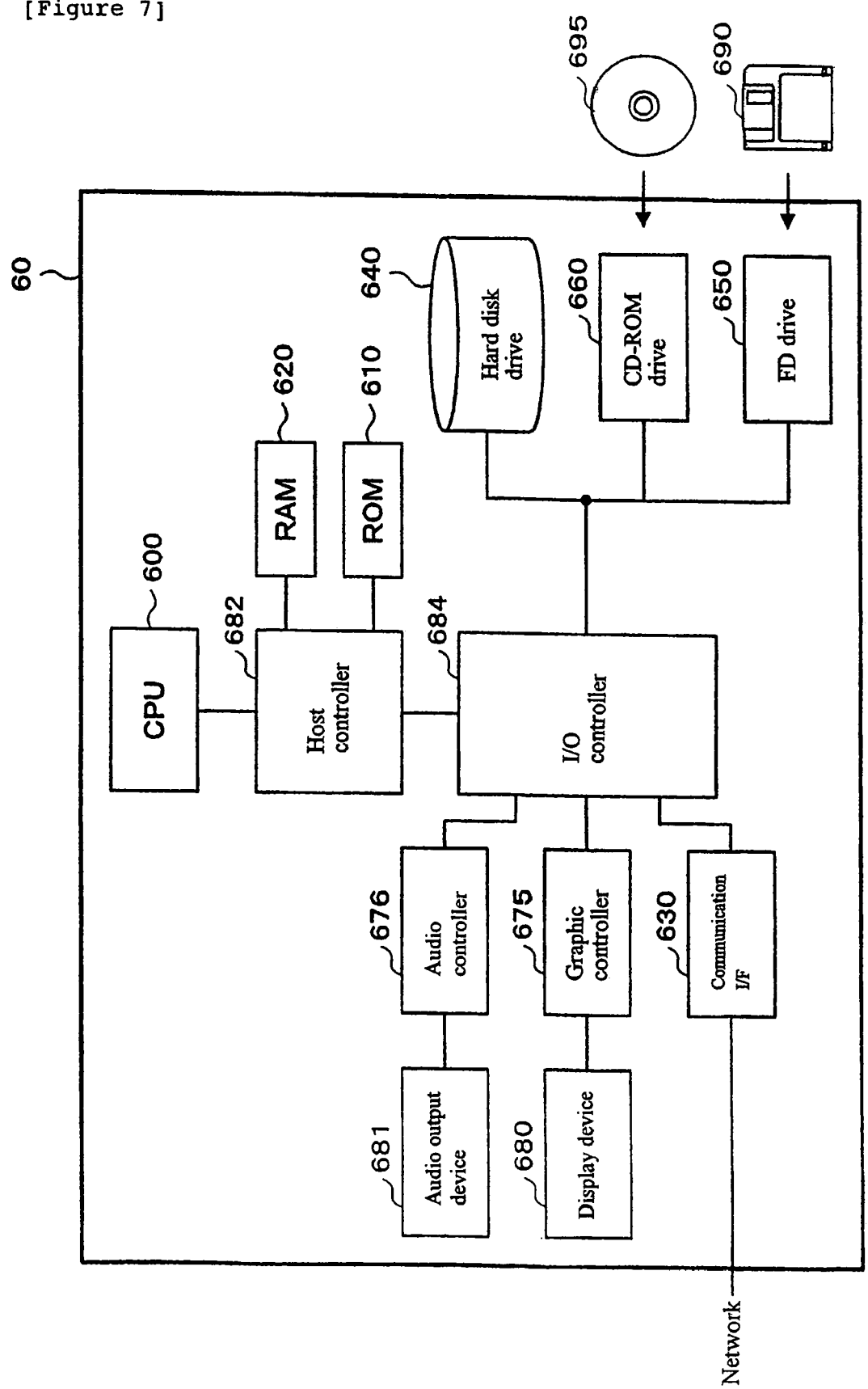

[Figure 8]

Table 1 Service definitions

| Service number | Source IP address | Destination IP address | Port number | Transaction type |
|---|---|---|---|---|
| 0 | 0.0.0.0 | 0.0.0.0 | 0 | none |
| 1 | 192.168.0.19 | 192.168.0.53 | 80 | /PlantsByWebSphere/servlet/ShoppingServlet |
| 2 | 192.168.0.19 | 192.168.0.54 | 80 | /PlantsByWebSphere/servlet/ShoppingServlet |
| 3 | 192.168.0.19 | 192.168.0.53 | 80 | /trade/scenario |
| 4 | 192.168.0.19 | 192.168.0.54 | 80 | /trade/scenario |
| 5 | 192.168.0.54 | 192.168.0.53 | 5558 | Unknown |
| 6 | 192.168.0.53 | 192.168.0.54 | 9081 | /PlantsByWebSphere/servlet/ShoppingServlet |
| 7 | 192.168.0.54 | 192.168.0.54 | 9081 | /trade/scenario |
| 8 | 192.168.0.54 | 192.168.0.53 | 9081 | /PlantsByWebSphere/servlet/ShoppingServlet |
| 9 | 192.168.0.54 | 192.168.0.53 | 9081 | /trade/scenario |
| 10 | 192.168.0.53 | 192.168.0.52 | 50000 | DB2 |
| 11 | 192.168.0.54 | 192.168.0.52 | 50000 | DB2 |

[Figure 9]
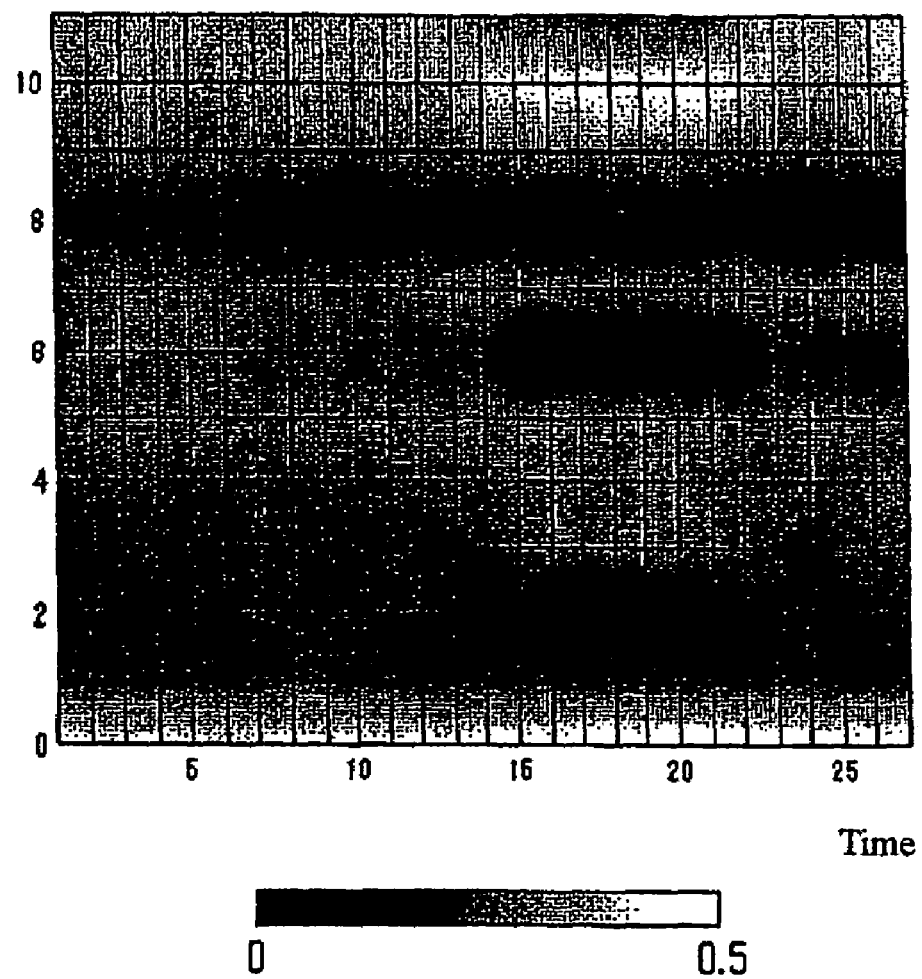

[Figure 10]
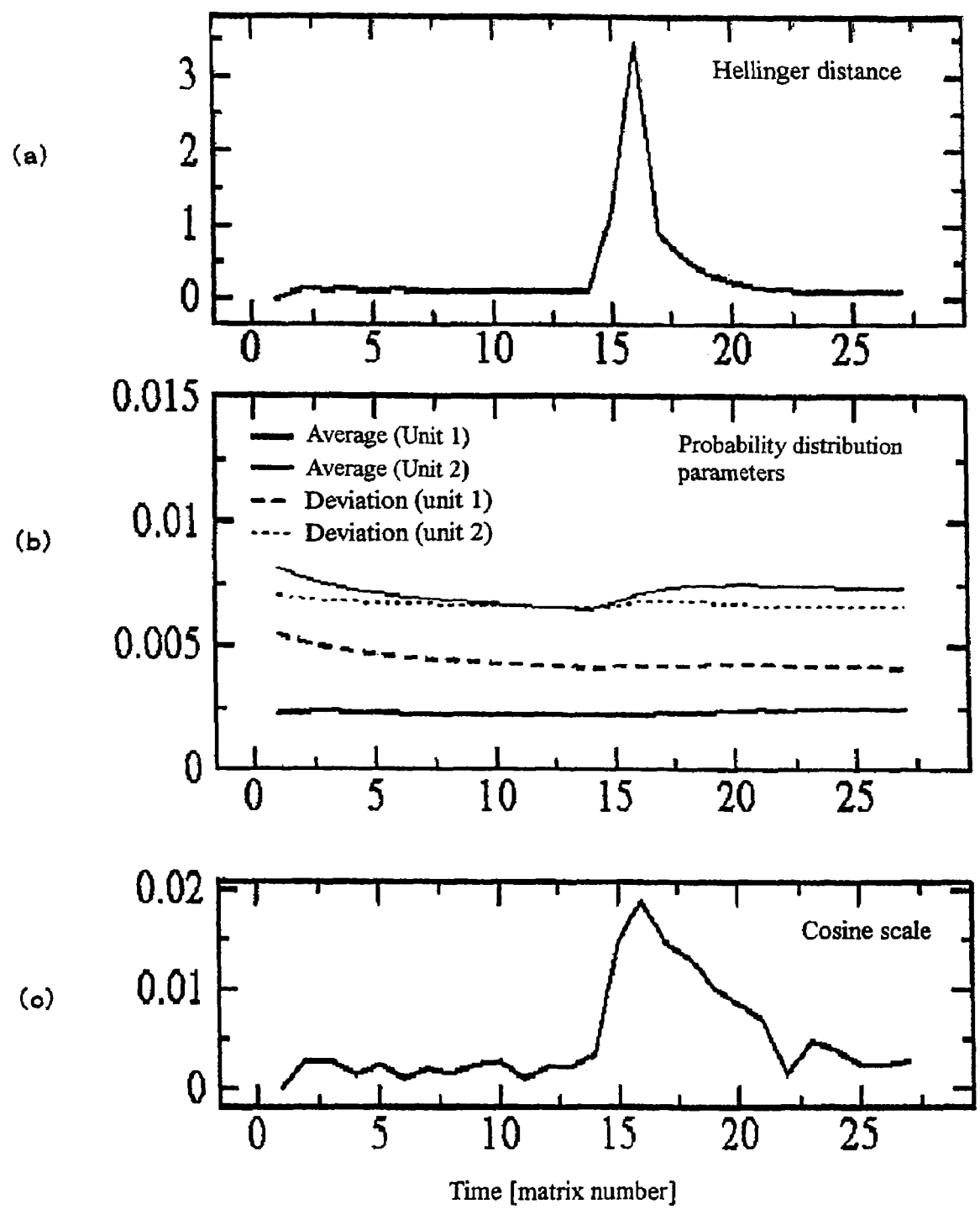

ANOMALY DETECTION

FIELD OF THE INVENTION

The present invention relates to an anomaly detection system, an anomaly detection method, an anomaly detection server, an anomaly detection program, and a storage medium. In particular, the present invention relates to an anomaly detection system, an anomaly detection method, an anomaly detection server, an anomaly detection program, and a storage medium for detecting an anomaly condition of a computer system consisting of a plurality of computers.

BACKGROUND

Network systems consisting of a large number of components interconnected intricately have attracted attention in various fields. For instance, studies on descriptions of many-body systems of electrons or atoms are dominant in the field of solid-state physics. In the field of economics, relationships between nations or categories of industries have been discussed from long ago. Network systems onto which a large number of computers are connected also fall in this category.

A difficulty in computer network systems is that, because different observables for monitoring those systems exist at different layers of the OSI hierarchical model, one must determine which layer they should be focused on or how they should consider the relationships between the layers. Furthermore, there is the fundamental problem as to which observational data should be used for describing interactions between bodies in a many-body system since interactions between network nodes at each layer are not explicitly defined.

The more the importance of information technology in society increases, the more serious the impact of major faults of computer systems becomes. In recent distributed complex systems, it is desirable to provide some autonomic functions in the computer system itself to eliminate the need for a human administrator to constantly monitor the system.

The following documents are considered:
[Patent Document 1]
Published Unexamined Patent Application No. 2003-60704
[Non-Patent Document 1]
H. Hajji, "Baselining Network Traffic and Online Faults Detection", IEEE International Conference on Communications 2003, Volume: 1, 2003, 301-308

One method for providing a computer with such autonomy to detect anomalies in it may be measures to sense the whole system in a comprehensive manner to detect any sign of faults automatically. However, there is still the problem of how to describe the state of the whole computer system and detect faults in it, because of the complexity of observational data which is inherent in the multilayer structure of a computer network or the complexity of observational data in correlated systems.

For instance, products called Network Node Management Systems (hereinafter abbreviated to "NNMSs") for computer system management are commercially available and widely used. However, these systems have poor automatic fault detection capabilities although they feature information gathering and visualizing capabilities. In fact, the NNMSs typically have SNMP (Simple Network Management Protocol) management capabilities.

However, because SNMP trap events occur too frequently in a default configuration and the individual trap events are not necessarily related to actual faults, some administrators keep the trap event transmission option turned off. Consequently, even if an NNMS is used, monitoring visualized observables constantly by a human administrator is practically the only solution to detect the sign of faults.

Considering Web-based systems for example, which are becoming increasingly important in business today, issues of system monitoring technology can be summarized as follows.

First, either observed values or random variables of observed values may be used for constantly monitoring systems. In Web-based systems in which typically observable quantities vary strongly over time, techniques in which observed values are directly used are difficult to apply because threshold values for detecting faults cannot easily be determined. Therefore, treating observed values as random variables may be a realistic method that allows anomaly detection in Web-based systems.

A second issue is whether behavior at layers below the TCP layer or at the application layer of the OSI hierarchical model should be monitored. For instance, in a large-scale three-tier Web-based system including an HTTP (Hyper Text Transfer Protocol) server, a web application server, and a database server, these servers cooperate with one another. Operations in such a system are performed between servers through programs For instance, a program of an HTTP server may call a program of a Web application server. Accordingly, an appropriate description of the interaction between servers at the application layer is essential as state descriptions. Therefore, the interaction between servers in a Web-based system would be able to be monitored by observing the application layer.

Third, observed values in multiple dimensions may be treated by considering correlations between observation points or each piece of data may be independently treated without considering correlations between observation points. If distributed processing is implemented by a three-tier Web-based system as described above, monitoring information about a single server independently is not effective. Another method for monitoring information about servers independently is the approach using the SNMP described above.

Based on these issues, some of prior-art technologies relating to system monitoring technology will be described below.

In an article entitled "Baselining Network Traffic and Online Faults Detection" (H. Hajji, IEEE International Conference on Communications 2003, Volume 1, 2003, 301-308) describes an anomaly detection technique in which information gathered by kernel monitoring of an OS on a server is modeled by using a mixed normal distribution to detect anomalies. The technique uses only low-layer observed quantities such as arpStatsPkts specified in the MIB (Management Information Base) of an SNMP agent. The article reports that change points only in individual quantities such as the number of ARP packets can be automatically detected. Therefore the article does not disclose a technique for detecting faults, including those at the application layer, in systems such as Web-based systems, which is the second issue.

Published Unexamined Patent Application No. 2003-60704 discloses an approach to monitoring a system by predicting a threshold value for determining that there is an anomaly in a computer network system and updating the threshold value dynamically. However, this approach falls far short of practical applicability to fault detection in real computer systems such as Web-based systems because the observation unit time span for predicting the threshold value is several hours or days.

Another problem is that no adequate answer has been provided as to what should be observed as metrics for monitoring systems in order to implement these system-monitoring techniques in actual systems. As described above, appropriate descriptions of interactions between servers at the application layer are essential in fault detection in Web-based systems.

Japanese Patent Application No. 2003-432337 proposes a metric to be monitored. It describes techniques for calculating the dependency between services from the number of packets transmitted between servers for calculating the dependency between applications at runtime in a server system. Using these techniques, the dependencies between applications (for example applications running on servers such as an HTTP server and a database server) can be obtained as a weighted directed graph. This means that a matrix representing the dependencies between systems can be obtained.

There is no known effective technique in which a matrix representing the dependencies between systems is generated at predetermined time intervals and anomalies are detected from changes in the system over time. The present invention focuses attention on information about the dependencies between nodes in a system and provides a method for abstracting unnecessary degrees of freedom and automatically extracting those nodes with high "activity" that frequently interact with each other. Another object of the present invention is to build an automatic fault detection system using the approach.

SUMMARY OF THE INVENTION

In light of the problems with the prior art described above, an object of the present invention is to provide methods, apparatus and systems that are robust to large variations in observed values or correlations over time, considers inter-dependences between observation points in a runtime environment, and is capable of automatically detecting faults such as service shutdown at the application layer.

In order to solve the problems, an exemplary embodiment of the present invention provides an anomaly detection system in which an agent device for associating and recording with a service transactions which are processes of the service is provided in each computer in a computer system forming a network of a plurality of computers, each agent device sends transactions to an anomaly monitoring server connected to the system, the anomaly monitoring server collects recorded transactions from the agent devices, outputs a node correlation matrix from the collected transactions, solves an equation specific to the node correlation matrix to obtain an activity vector, and calculates an outlier of an activity vector from a probability density used for estimating the probability of occurrence of the activity vector from the calculated activity vector to automatically detect a fault in a program running through interactions between the plurality of computers. It also provides an anomaly detection method, an anomaly detection server, and an anomaly detection program, and a storage medium therefor.

ADVANTAGES OF THE INVENTION

According to the present invention, faults in a complex computer system such as a Web-based system can be automatically detected in a runtime environment in an early stage, including faults at the application layer which were difficult to detect with the prior-art techniques.

BRIEF DESCRIPTION OF THE DRAWINGS

These, and further, aspects, advantages, and features of the invention will be more apparent from the following detailed description of a advantageous embodiment and the appended drawings, in which:

FIG. 1 is a block diagram of a Web-based system 10;

FIG. 2 is a conceptual diagram showing relations between a client device 40 and servers and programs;

FIG. 3 is a conceptual diagram showing relations between redundant Web servers 20, 21 and programs;

FIG. 4 is a diagram showing an example in which an anomaly detection system is applied to the Web-based system shown in FIG. 3;

FIG. 5 is a diagram showing an example in which agent devices or modules are applied to network devices;

FIG. 6 is a diagram showing a process flow in an anomaly monitoring server 60;

FIG. 7 is a diagram showing an exemplary hardware configuration of the anomaly monitoring server 60;

FIG. 8 is a table containing transactions of services;

FIG. 9 is a graph representing calculated activity vectors with respect to service numbers and in a time sequence; and FIG. 10 shows graphs representing calculated outliers in a time sequence.

DESCRIPTION OF SYMBOLS

10 . . . Web-based system
20, 21 . . . Web server
30 . . . Load balancing device
201, 211 . . . HTTP server program
202, 212 . . . Web application server program
40 . . . Client device
50 . . . Database server
60 . . . Anomaly monitoring server
720, 721, 740, 750, 760, 761, 762 . . . Agent device

DETAILED DESCRIPTION OF THE INVENTION

The present invention provides methods, apparatus and systems that are robust to large variations in observed values or correlations over time, robust to large variations in observed values or correlations over time, considers inter-dependences between observation points in a runtime environment, and is capable of automatically detecting faults such as service shutdown at the application layer.

An exemplary embodiment of the present invention provides an anomaly detection system in which an agent device for associating and recording with a service transactions which are processes of the service is provided in each computer in a computer system forming a network of a plurality of computers, each agent device sends transactions to an anomaly monitoring server connected to the system, the anomaly monitoring server collects recorded transactions from the agent devices, outputs a node correlation matrix from the collected transactions, solves an equation specific to the node correlation matrix to obtain an activity vector, and calculates an outlier of an activity vector from a probability density used for estimating the probability of occurrence of the activity vector from the calculated activity vector to automatically detect a fault in a program running through interactions between the plurality of computers. It also provides an anomaly detection method, an anomaly detection server, and an anomaly detection program, and a storage medium therefor.

Thus according to the present invention, faults in a complex computer system such as a Web-based system can be automatically detected in a runtime environment in an early stage, including faults at the application layer which were difficult to detect with the prior-art techniques.

Examples of advantageous embodiments of the present invention will be described with reference to the accompanying drawings. In the embodiment described below, the present invention is applied to a Web-based system, which is an example of an advantageous embodiment of a computer system according to the present invention. The embodiment of the present invention is not limited to a Web-based system but can be applied to any systems such as client-server systems and LAN systems that consist of a plurality of computers.

FIG. 1 is a block diagram of a Web-based system 10, which is an advantageous embodiment of the present invention. The Web-based system 10 to which the present invention is applied includes a router 45 that mediates network connection from a client device 40, Web servers 20, 21 provided in a redundant manner, a database server 50, a load balancing device 30 which determines access destinations of the redundant Web servers 20, 21, an anomaly monitoring server 60, and a public network 80. HTTP server programs 201, 211, and web application server programs 202, 212 are running on the Web servers 20, 21. The Web servers 20, 21 may store data inputted from the client device 40 in the database server 50 or may return data obtained from the database server 50 to the client device 40. While the client device 40, Web servers 20, 21, database servers 50 are interconnected through the public network 80, they may be interconnected without the public network 80 or the Internet may be used instead of the public network 80.

The types of the servers and the programs running on the servers are shown by way of example only and not by limitation.

FIG. 2 is a conceptual diagram depicting the web-based system including the client device 40, Web server 20, and database server 50. In this example, an HTTP server program 201 and Web application server program 202 are running on the Web server 20. The IP addresses and port numbers of the client device 40 and the servers are shown below the nodes. The IP addresses, port numbers, nodes, and correlations between the nodes will be described below.

Focusing attention on correlations or the dependencies between vertices of the network in a computer system, the dependencies between nodes in the system at runtime will be considered. A "node" is a unit to be monitored for faults and can be identified with an IP address, for example. If two programs are running on a single Web server as shown in FIG. 2, nodes may be applications that are identified in the form of (IP address, port number). "Services" are used by way of example. A "service" is a process performed by a server program for generating data required for another server program. In other words, the correlation between nodes is considered as a "service," i.e. a 3-tuple of (source IP address, destination IP address, destination port number). Furthermore, the number of times that a service i caused another service j in a certain period of time is represented as the weight between the services i and j.

In FIG. 2, (192. 168.0.19, 192.168.0.53, 80) is an example of the service. Typically, correlations between services can be represented by a matrix. This matrix is referred to as a service correlation matrix and described in the form of equation (1-1).

$$S_{ijk}=(I_i,I_j,p_k) \quad (1\text{-}1)$$

$$S_{ijkl}=(I_i,I_j,p_k,t_l) \quad (1\text{-}2)$$

where I denotes an IP address and the source IP address is a component of i and the destination IP address is a component of j. p denotes a destination port number. In addition to a source IP address, destination IP address, and destination port number, a destination transaction type may be included in a service. In that case, the service correlation matrix is represented as equation (1-2), where t denotes the destination transaction type.

The elements of the correlation matrix (1-1) are represented as equation (2).

$$b(S_{1mn},S_{ijk}) \quad (2)$$

Here, B(t) is represented as equation (3).

$$B(t) = \begin{pmatrix} b_{11} & b_{12} & \cdots & b_{1n} \\ b_{21} & b_{22} & \cdots & b_{2n} \\ b_{n1} & b_{n2} & \cdots & b_{nn} \end{pmatrix} \quad (3)$$

$$a_{ijk} = \sum_s b(s, s_{ijk}) \quad (4)$$

Given a quantity expressed by equation (4), this can be considered as representing the frequency of appearance of the service $S_{ijk}=(I_i, I_j, p_k)$. If the port number is contracted, a matrix representing the communication relationship between the IP addresses can be extracted from equation (4). This can be expressed as equation (5).

$$C_{ij} = \sum_{p_k} a_{ijk} \quad (5)$$

Alternatively, the IP address of the parent service can be contracted to represent the service correlation matrix as equation (6).

$$d_{jk,lm} = \sum_{I_i} (s_{ijk}, s_{klm}) \quad (6)$$

In this way, the dependency between applications $(I_i, p_k)$ and $(I_1, p_m)$ can be extracted. The term "node" is used hereinafter to refer to an abstract concept representing a service or a host that receives a service and the correlation matrix of nodes (hereinafter referred to as a "node correlation matrix") is represented by the symbol B.

While the interrelation between nodes is considered as a service, which is a 3-tuple of (source IP address, destination IP address, destination port number) in the foregoing description, a source port number may be included. Elements that can be included are not limited to IP addresses and port numbers. Other elements, such as a MAC address may be used. A transaction type at a particular port number may be included. IP addresses may be IP version 6 IP addresses.

In the present invention, applying some preprocess to the matrix B is often effective. It is especially effective to transform matrix elements $f_{ij}$ by using a monotonic function f and equation (7) in order to restrict the range of value.

$$b_{ij} \to f(b_{ij}) \tag{7}$$

A logarithmic transformation is often useful as the function f in Web-based systems.

$$f(b_{ij}) = \log(1 + b_{ij}) \tag{8}$$

Again, the matrix elements were transformed according to the equation provided above. A hyperbolic tangent tanh or any other functions may be used in preprocessing the matrix. Alternatively, normalization that provides a row sum or column sum of 1 may be used instead of transformation with f. Whichever of these is chosen, the essence of the present invention is not lost.

If a fault occurs in the system at runtime, a change appears in the node correlation matrix. However, even if a change appears, it is difficult to detect a fault by monitoring each element independently. This is because extensive observed quantities such as the frequency of calls strongly fluctuate over time and even if a significant change is observed, it is difficult to determine whether the change is due to a fault or just a fluctuation in traffic.

Therefore, a quantity that indicates a change of the whole system is extracted. A node correlation matrix given at a certain time represents the dependency between nodes around that time. The "dependency" here may have meaning corresponding to the intensity or rate of transition from one node to another. Therefore, an equation of motion as equation (9), which is similar to Kolmogorov's equation in the Markovian process theory, is assumed for this matrix.

$$\frac{du}{dt} \propto Bu \tag{9}$$

Node correlation matrix B depends on the time at which observation is made. It is assumed here that dynamics in a time slot are considered and B in equation (9) is a constant.

Here, u is a state vector expressed by equation (10).

$$u = \begin{pmatrix} u_1 \\ u_2 \\ \vdots \\ u_n \end{pmatrix} \tag{10}$$

Interpreting this according to the motion equation (9), each element of the state vector can be considered as a weight indicating which node processing is being performed on at a certain time when the system is observed.

It is natural to consider the stationary state of the motion equation (9) directly reflects the features of the system including the dependency between nodes. The node correlation matrix can be assumed as a non-negative matrix. According to the Perron-Frobenius theorem, an eigenvalue having the largest magnitude is real and isolated, and all elements of the corresponding eigenvector are positive. This means that the feature quantity of the node correlation matrix can be considered as the solution of the eigenequation:

$$Bu = \lambda u \text{ where } |u| = 1 \tag{11}$$

Alternatively, the feature value of the node correlation matrix can be considered as the solution of the extremum equation, which is equivalent to the above equation.

$$u_1 = \arg_u \max(u^T B u) \text{ s.t. } |u|^2 = 1 \tag{12}$$

Since B is a non-negative matrix, it is obvious that the maximum value in equation (10) is attained if the weight of $u_1$ is large for a node where a matrix element is larger. If a node i actively calls other nodes, the above-described feature quantity has a large weight for the node i. Following this interpretation, the feature quantity can be called an active vector.

Specific calculations to solve the eigenequation will be described below. Dependency matrices in computer systems typically have the characteristic that they include relatively many zero elements. This is also true for activity vectors. The more complex a system is, the larger its matrix is. The size of a matrix can be on the order of several hundred to a thousand. In order to obtain the maximum eigenvector of such a large-scale sparse matrix, an algorithm called the power method is a good way. In the power method, an initial vector W having a given (often random) element is multiplied by a matrix B. Suppose that the initial vector w can be expanded by using the eigenvectors $\{u_1, u_2, u_3, \ldots\}$ of B and a set of real constants $\{c_1, c_2, c_3, \ldots\}$ as follows.

$$w = c_1 u_1 + c_2 u_2 + c_3 u_3 +$$

Then B raised to the k-th power is applied to the above equation.

$$B^k w = c_1 \lambda_1^k u_1 + c_2 \lambda_2^k u_2 + c_3 \lambda_3^k u_3 + \ldots \tag{14}$$

$$= \lambda_1^k \left( c_1 u_1 + c_2 \left(\frac{\lambda_2}{\lambda_1}\right)^k u_2 + c_3 \left(\frac{\lambda_3}{\lambda_1}\right)^k u_3 + \ldots \right)$$

where $\lambda_i$ is an eigenvalue belonging to $u_i$ ($\lambda_1$ is the maximum eigenvalue). Therefore, it can be seen that as k increases, the direction of the vector $B^k w$ converges to $u_1$. This holds only when the maximum eigenvalue of B is not degenerate and is a real number. Since the dependency matrix is a non-negative matrix, it is ensured by the Perron-Frobenius theorem that the maximum eigenvalue is real and isolated.

The power method is an extremely fast algorithm and therefore the calculation time practically poses no problems in online fault detection at the application layer of the computer systems of interest. While the power method is used for calculating the eigenequation in the present invention, using this method is not essential for the present invention and other methods may be used.

The eigenequation (11) is homogeneous with respect to the eigenvectors. Therefore, each element of the node correlation matrix varies depending on traffic, whereas the activity vector is hardly affected by the traffic change itself if appropriate normalization conditions are imposed. Therefore, changes in the essential order of the system can be monitored independently of extreme fluctuations in an observed quantity, which would pose problems in Web-based systems, by monitoring the activity vector.

A specific method for calculating the activity vector in a real Web-based system will be described below.

FIG. 3 is a conceptual diagram of a Web-based system including a client device 40, Web servers 20 and 21, a database server 50, and a load balancing device 30. On the Web servers 20, 21, HTTP server programs 201, 211, and Web application server programs 202, 212, are running. The Web servers 20 and 21 are doubly redundant. The Web servers 20 and 21 are accessed by the client device through the load balancing device 30.

The fact that the system is doubly redundant with the Web servers 20 and 21 is not essential for the present invention. The system may include more than two redundant servers or may be a system with no redundant servers. Also, the load balancing device 30 may be omitted from the system.

It is assumed here that no requests have been provided to one of the HTTP servers since some point of time due to a cause such as erroneous file setting on the load balancing device 30. Even in such a case, the whole server process itself continues running, no anomaly is in the TCP layer and the layers below, and, as long as the load is light, no anomalies appear in response time or throughput. However, this situation is potentially dangerous because an increase in traffic may cause serious problems in the servers far before the traffic volume exceeds the rated capacity of the system. Since one object of the present invention is to detect such potentially dangerous states of servers, the Web-based system shown in FIG. 3 is a suitable embodiment in the anomaly detection system of the present invention.

FIG. 4 is a schematic diagram showing an anomaly detection system, which is one advantageous embodiment of the present invention, applied to the Web-based system in FIG. 3. The anomaly detection system includes a plurality of computers in the Web-based system, an anomaly monitoring server 60, and agent devices 720, 721, 740, and 750. The agent device 720, 721, 740, 750 collecting transactions is provided in each of the computers. The anomaly monitoring server 60 is connected to the network of the Web-based system as shown in FIG. 1 and collects transactions recorded by the agent devices 720, 721, 740, 750 over a network (as indicated by the arrows in FIG. 4).

While the agent devices 720, 721, 740, 750 are devices that associate and record transactions, which are processes of services performed by the computers, with the services, they may be a software processing mechanism for recording transactions. That is, they may be provided in computers, which are devices or server, as software processing agent modules. The agent devices or modules 720, 721, 740, 750 may be provided within the computers or may be provided as external devices. In the system shown in FIG. 4, only an agent device 750 is an external device and the other agent devices 720, 721, 740 are embedded in the computers. Whether an external or embedded gent device 720, 721, 740, 750 is used for one computer is not essential in the present invention and the system shown in FIG. 4 is provided for illustrative purpose only.

If the agent devices 720, 721, 740 are provided as software agent module in the computers, flexible disks or CD-ROMs are used as storage media on which the software and programs are stored and the software and programs are installed into the computers from the storage media. The software and programs may be read from a particular server and installed into the computers over a network. The software may also be installed in agent device 750 from such storage media or over the network.

If an external agent device is provided separately from the computers, the hardware configuration of the agent device may include a CPU for performing computational processing, a RAM for storing data and programs, a communication interface for connecting the system to the network an input/output controller for controlling input/output of the data, a host controller for controlling the input/output and processing, and a ROM. The agent device may be a separate computer other than computers constituting the system.

Transactions of the computers and servers associated with the agent devices or modules 720, 721, 740, 750 are recorded on the respective devices or modules. The recorded data is sent to a transaction collecting section of the anomaly monitoring server 60 in real time or at predetermined time intervals. One agent device or module may record transactions of one computer or more than one computers. Also, an agent device or module may be contained in the anomaly monitoring server 60.

As shown in FIG. 5, agent devices 760, 761, 762 may be embedded in network devices such as a router, switch, hub, and bridge. The agent devices may be software processing mechanisms installed in the network devices for recording transactions which are processes of services.

In any cases, transaction data is sent from the agent devices to the transaction collecting section of the anomaly monitoring server 60.

Software and programs to be provided to the network devices may be installed from a flexible disk, CD-ROM, or other recording media to the network devices such as routers and switches, or the software and programs may be recorded on a hard disk in a particular server and provided to the network devices such as routers over a network. Also, the devices may be external devices that have the hardware configuration as described above and connected to the system separately from the network devices such as routers and switches.

FIG. 6 is a conceptual diagram depicting a logical configuration of the anomaly monitoring server 60. The anomaly monitoring server 60 includes a transaction collecting section 601, a correlation matrix calculating section 602, an activity vector calculating section 603, a probability estimating section 604, and a fault detecting section 605. The arrows in the figure represent a process flow in the anomaly monitoring server 60.

FIG. 7 is a block diagram showing an exemplary hardware configuration of the anomaly monitoring server 60. The anomaly monitoring server 60 includes a CPU 600 for performing computational processing, a RAM 620 for storing data and programs, a hard disk drive 640, a CD-ROM drive 660, an FD drive 650, a communication interface 630 for connecting the system to the network, a graphic controller 675 for outputting images, a display device 680 for displaying the images, an audio output device 681 for outputting audio, an audio controller 676 for controlling the audio output, an input/output controller 684 controlling the input/output of these data, a host controller 682 for controlling the input/output and processing, and a ROM 610.

A program for detecting anomalies is stored in a storage medium such as a flexible disk 690, a CD-ROM 695, or an IC card and provided by a user to the system. The program is installed into the anomaly monitoring server 60 from the storage medium through the I/O controller 684. These types of storage media are given by way of example only. The program may be installed from other storage media such as a DVD, MO, and IC card. Also, the program may be stored on a hard disk of a particular server or computer and installed from the computer over the network.

FIG. 8 shows exemplary transactions. A transaction is a process of a service that has been actually performed by a server program called by another server program. For instance, the service 1 represents a service with the transaction type of /PlantsByWebSphere/servlet/ShoppingServlet from the IP address 192.168.0.19 to 192.168.0.53 at port number 80. The service 0 represents a virtual caller service for a service which has not been called by any actual callers. This is unnecessary for the present invention but introduced for a reason in generating the dependency matrix. Since loopback packets were ignored, the services indicated by dashed lines in FIG. 3 do not appear.

Which services and transactions should be extracted and observed depends on the programs running on the Web-based system. All services performed on the Web-based system may be extracted or only those services associated with port numbers such as well-known ports for fundamental programs may be extracted.

The agent devices record transactions from the computers and the transaction collecting section 601 of the anomaly monitoring server 60 collects that transaction data. From the data, the correlation matrix calculating section 602 of the anomaly detecting server 60 calculates the node correlation matrix B. The method described in Japanese Patent Application No. 2003-432337 that calculates service dependency from packets transmitted between servers may be used.

The transaction data may be real-time data or data captured previously. Log data that records communications between the computers and network devices constituting the system may be used for the transaction data. Data exactly evaluated through server logs using an API called ARM (Application Response Measurement) may be used to calculate the node correlation matrix. Lower-level correlation information such as in equation (5) may also be used for the node correlation matrix B in combination with these data.

In the event that a process performed on one of the WASs (Web Application Servers) halts in the Web-based system shown in FIG. 4, a process by the other WAS continues running because of the redundancy (the relationship between WAS 202 and WAS 212). Therefore, the halt has little effect on response time until resource usage reaches 100%. Furthermore, if a process on a WAS stops, the network itself continues running.

The following problem is to be detected here. A bug is placed in one of the two application programs ("Plants") running only on one of the redundant Web application servers 20 and 21 to cause it to malfunction to stop transactions performed with the database server 50 at a time point. The process on each server is kept running. Because the two WASs 202 and 212 are running on the system, a finite volume of TCP traffic will be observed between one of the WASs that is working and the database server even though a malfunction has occurred on the other. Consequently, no fault is recognized in the layers below the application layer. Furthermore, since the two redundant Web application servers are working, a client may feel little change in response time as long as the traffic is sufficiently small. Thus, a fault that is specific to the application layer can be detected in this example.

In the Web-based system shown in FIG. 3, the node correlation matrix Bis calculated at predetermined time intervals with the method described above. The time intervals for generating B may be set by a human administrator at his/her discretion according to traffic on the system of interest, the hardware capabilities of the transaction collecting section 601, the agent devices and modules 720, 721, or the time scale for a fault to be detected. Typically, the time scale may be ten to several hundred seconds. In this example it is set to 20 seconds. The node correlation matrix B can be normalized so that the call intensity of the services becomes 1. Using the matrix B, the activity vector calculating section 603 of the anomaly monitoring server 60 solves equation (11) to obtain the activities of services.

FIG. 9 shows a graph of activity vectors calculated after the logarithmic transformation of equation (7) is applied to the service correlation matrix obtained in time series. In this graph, the activity vectors normalized to 1 are plotted along the horizontal axis, which is the time axis. The numbers on the horizontal axis are observation numbers. Since the matrix is generated every 20 seconds, 15 for example on the horizontal axis corresponds to 5 minutes.

A clear anomaly can be seen in the range between 15 and 22 on the horizontal axis in FIG. 9. In can be seen that the activities of the services 2, 6, 11 decreased in this period whereas the activity of the service 10 increased. This is understood as follows. Because of the sudden decrease of the number of transactions of service 11 relating to Plants, [11] 192.168.0.54-->192.168.0.52/50000:DB2, the activity of [6] 192.168.0.53-->192.168.0.54/9081:/PlantsByWebSphere/servlet/ShoppingServlet also decreased. Since loopback packets are not observable, besides the activity of service 6, the activity of [2]192.168.0.19-->192.168.0.54/80:/PlantsByWebSphere/servlet/ShoppingServlet, which is upstream of 192.168.0.54-->192.168.0.54/9081:/PlantsByWebSphere/servlet/ShoppingServlet should and did decrease. This result demonstrates that the activity vector expresses the faulty transaction and the transaction affected by the faulty transaction.

It is clear from the result that an activity vector can appropriately show a malfunction of a Web application. As described earlier, since a malfunction of one of applications does not cause a change in response time that is noticeable to a client and no anomaly arises in the network if redundant servers are provided, it is difficult to detect such faults according to the prior art. However, calculating activity vectors allow anomalies in a Web-based system at the application layer as described above.

After the activity vector calculating section 603 of the anomaly monitoring server 60 calculates an activity vector, the fault detecting section 605 can display the activity vector on the display screen of the anomaly monitoring server 60 or provide an audible alarm to notify the anomaly. FIG. 9 is a graph of calculated activity vectors, which has 36-dimensional service numbers on the vertical axis and time on the horizontal axis. The fault detecting section visually displays activity vectors in this way. When an anomalous indication appears (the period from time 50 to 84), the display device 680 or the audio output device 681 of the anomaly monitoring server 60 may alert visually or audibly an administrator to the anomaly from the difference in the display image. Alternatively, instead of displaying activity vectors constantly, maintenance staff may be alerted only when an anomaly is detected.

However, it may be more desirable that a change in activity vectors due to an anomaly be automatically detected from the past observed values.

As an outlier detection method for determining that an observed value is an outlier, the three sigma method or regression analysis may be used. These methods regard data departing from a standard deviation or residual as an outlier. Alternatively, a method based on time-series prediction may be used in which time-series data is modeled as time-series models such as autoregressive models and, from the time-series model at time t, the probability distribution of the observed value at the next time t+1 is obtained. Then, testing hypothesis or Hellinger distance is used to determine whether the value is an outlier. Another method may be used in which a model that is not based on autoregressivity such as a mixed normal distribution is used to learn parameters after each observation (the online EM algorithm), and an outlier is determined from the learned distribution by using the testing hypothesis or Hellinger distance method.

While activity vectors may be directly applied to these outlier detection methods, they may be converted into a scalar scale described below before they are used. Since the activities of most services are zero, it is wasteful if activity vectors are directly used in outlier diction. Therefore, the mean vector of time varying activity vectors is calculated with a forgetting rate r, where the forgetting rate is defined that its reciprocal represents data points of interest. For example, if the forgetting rate is 0.01, it means that the mean value of the past 100 data points is calculated. The value of the forgetting rate depends on intervals in which node correlation matrices are generated, the amplitude of fluctuation of generated matrixes, and a time scale for faults to be detected. Typically, values in the range between approximately 0.01 and 0.5 can be used (that is, the past several to 100 values are taken into account). A forgetting rate of 0.1 is used here. The activity vector at time t is represented by $u^{(t)}$ and the following equation is used.

$$m^{(t)} = r u^{(t-1)} + (1-r) m^{(t-1)} \tag{15}$$

Using equation (15), the mean vector $m^{(t)}$ is updated online. Then a new random variable is defined by equation (16).

$$c^{(t)} = 1 - \frac{u^{(t)T} m^{(t)}}{|u^{(t)}||m^{(t)}|} \tag{16}$$

Equation (16) yields zero if the present activity vector obtained exactly equals the mean vector of the past data, or one if it is orthogonal to the mean vector. Thus, equation (16) represents the "dissimilarity" of the activity vector obtained in a time series to the mean vector. This quantity is essentially equivalent to the cosine of the angle between the activity vector and the mean vector and can be called the "cosine measure."

FIG. 10(c) is a graph of activity vectors, with their values transformed into cosine measures on the vertical axis and time on the horizontal axis. From this graph, outliers are found in the period between 15 and 20. FIG. 10(b) shows the result of learning using the online EM algorithm (the forgetting rate may be set to 0.1 and a random number may be given as the initial value). This calculation will be described below.

Described below is a method for obtaining a Hellinger score by learning a probability distribution using an online EM algorithm on the basis of a mixed normal distribution. The value of an activity vector may be directly used as input data or a dissimilarity, which is a scalar quantity based on a cosine measure as described above may be used as the input data.

Typically the mixed normal distribution can be represented as equation (17).

$$p(y) = \sum_{l=1}^{K} \frac{\pi_l}{(2\pi)^{d/2} |\Sigma_l|^{1/2}} \exp\left[-\frac{1}{2}(y-m_l)^T \Sigma_l^{-1}(y-m_l)\right] \tag{17}$$

where K is the number of mixed distributions, $\Sigma$ and m are a covariance matrix and a mean vector, respectively, with the subscript l for each distribution. These parameters are updated every time an observed quantity y is obtained. This method is known as an online EM algorithm. If K=2, then it can be interpreted that two distributions express normal and anomalous states.

Using this model, probability distribution can be sequentially calculated to calculate a change in the probability distribution as the Hellinger distance (equation (18)) which is the definition of the distance between distributions.

$$\Delta p(t) = \int dy (\sqrt{p_t(y)} - \sqrt{p_{t-1}(y)})^2 \tag{18}$$

where $p_t$ represents the probability distribution at time t. The change can be evaluated as a logarithmic decrement by using equation (19).

$$\Delta p(t) = -\ln p_{t-1}(y_t) \tag{19}$$

FIG. 10(a) is a graph of Hellinger scores obtained by learning the probability distribution with the online EM algorithm based on the mixed normal distribution. Referring to the time point at which a pulse-like peak appears, the occurrence of an anomaly in the system can be identified. In this example, it can be seen that a malfunction occurred in one of Web applications in the peak period between 15 and 20. Compared with the dissimilarity based on the cosine measure in FIG. 10(c), it can be seen that fluctuations in the value are small and the malfunction of one of a plurality of Web applications, which would otherwise be hard to find, is properly represented.

Furthermore, using the activity vector or node correlation matrix at the Hellinger score peak time, an administrator can be easily notified of which node and which service has the fault.

The essence of the present invention is not limited to the use of the mixed normal distribution based on online EM learning as described above. The three sigma method or regression analysis may be used to obtain an outlier measure. Also, a non-parametric method (such as Singular-spectrum analysis) may be used.

In any cases, the probability estimating section 604 in the anomaly monitoring server 60 calculates the standard deviation or residual of data or learns a probability distribution online using an online EM algorithm. The information is provided to the fault detecting section 605, which finds an outlier and provides notification of a fault.

A program for the anomaly detection system or method can be stored on a storage medium such as a flexible disk, CD-ROM, or IC card, which is then provided to a user, and the user provides the program to the anomaly monitoring server and agent devices or modules.

The storage medium for the program may be an optical storage medium such as a DVD, MO, and PD, or a tape medium or a semiconductor memory. Alternatively, a storage such as a hard disk or RAM provided in a server system connected to a private communication network or the Internet may be used as the storage medium and the program may be provided from the storage over the network.

Means for implementing the anomaly detection system and method are as follows. Transaction recording means which associates and records a transaction, which is a process of a service performed by each of a plurality of computers in response to a call from a program running on any other computer, with that service may be implemented by agent modules or devices of a plurality of computers. Transaction collecting means which collects transactions recorded by the agent modules from the plurality of computers, correlation matrix calculating means which outputs a node correlation matrix calculated from the transactions collected from the plurality of computers, activity vector calculating means which calculates an activity vector by solving an eigenequation specific to the node correlation matrix, probability estimating means which estimates the probability of occurrence of the activity vector, and fault detecting means which calculates an outlier measure of the activity vector from a probability density estimated by the probability estimating means and automatically detects a fault in a program being run through cooperation among the plurality of computers may be implemented by an anomaly monitoring server.

Steps for implementing the anomaly detection system and method are as follows. A recording step of associating and recording a transaction, which is a process of a service performed by each of a plurality of computers in response to a call from a program running on any other computer, with that service may be implemented by agent modules or devices of a plurality of computers. A transaction collecting step of collecting transactions recorded by the agent modules from the plurality of computers, a correlation matrix calculating step of outputting a node correlation matrix calculated from the transactions collected from the plurality of computers, an activity vector calculating step of calculating an activity vector by solving an equation specific to the node correlation matrix, a probability estimating step of estimating the probability of occurrence of the activity vector, and a fault detecting step of calculating an outlier measure of the activity vector from a probability density estimated in the probability estimating step and automatically detecting a fault in a program being run through cooperation among the plurality of computers may be implemented by an anomaly monitoring server.

The anomaly detection program may include: a program installed and executed in an agent device or module for performing a recording step of associating and recording a transaction, which is a process of a service performed by each of a plurality of computers in response to a call from a program running on any other computer, with that service; and a program installed and executed in an anomaly monitoring server for performing a transaction collecting step of collecting transactions recorded by the agent modules from the plurality of computers, a correlation matrix calculating step of outputting a node correlation matrix calculated from the transactions collected from the plurality of computers, an activity vector calculating step of calculating an activity vector by solving an eigenequation specific to the node correlation matrix, a probability estimating step of estimating the probability of occurrence of the activity vector, and a fault detecting step of calculating an outlier measure of the activity vector from a probability density estimated in the probability estimating step and automatically detecting a fault in a program being run through cooperation among the plurality of computers.

The means and steps implemented by the anomaly monitoring server are not limited to implementation by a single server and a computer. They may be a plurality of servers and computers that performs processing in a distributed manner thereby functioning as an anomaly detection system.

According to the embodiments described above, there are provided an anomaly detection system, an anomaly detection method, and an anomaly detection server, an anomaly detection program, and a storage medium therefor.

(1) An anomaly detection system monitoring a program for a fault on the basis of a probabilistic model to automatically detect a fault, said program being run through cooperation between computers in a computer system forming a network consisting of a plurality of computers, said anomaly detection system comprising: a plurality of computers providing services associated with said program; an agent device associating and recording transactions with a service, said transactions being processes of said service performed by each of said plurality of computers in response to a call from a program running on another of said plurality of computers; and an anomaly monitoring server connected to said network, comprising, a transaction collecting section collecting transactions recorded by said agent device from each of said plurality of computers; a correlation matrix calculating section outputting a node correlation matrix calculated from said transactions collected from each of said plurality of computers; an activity vector calculating section calculating an activity vector by solving an eigenequation specific to said node correlation matrix; a probability estimating section estimating the probability of occurrence of said activity vector; and a fault detecting section calculating an outlier measure of the activity vector from a probability density estimated by said probability estimating section to automatically detect a fault in the program being run through cooperation between said plurality of computers.

(2) The anomaly detection system according to Item 1, wherein said service associated with said program and provided by each of said plurality of computers includes one or more items selected from a group consisting of an IP address, a port number, and a transaction type.

(3) The anomaly detection system according to Item 2, comprising a fault detecting section detecting a fault at the application layer of said program by using a service associated with said program and provided by each of said plurality of computers, said service including one or more items selected from a group including a source IP address, a destination IP address, a destination port number, and a transaction type at the destination port.

(4) The anomaly detection system according to Item 1, wherein said fault detecting section automatically detects a fault by transforming said activity vector into a cosine measure and calculating an outlier measure.

(5) The anomaly detection system according to Item 1, wherein said probability estimating section uses an online EM algorithm to learn a probability distribution online.

(6) The anomaly detection system according to Item 1, wherein said agent device is provided in said plurality of computers.

(7) The anomaly detection system according to Item 1, wherein said agent device is provided in a network device in said computer system.

(8) The anomaly detection system according to Item 1, wherein previously captured data about a transaction of each of said computers is used as data for calculating said node correlation matrix to determine the time point and service in which anomaly has occurred.

(9) An anomaly detection system for detecting a fault in a program being run through cooperation between computers in a computer system forming a network consisting of a plurality of computers, said anomaly detection system comprising: a plurality of computers providing services associated with said program; an agent device associating and recording transactions with a service, said transactions being processes of said service performed by each of said plurality of computers in response to a call from a program running on another of said plurality of computers; and an anomaly monitoring server connected to said network, comprising, a transaction collecting section collecting transactions recorded by said agent device from each of said plurality of computers; a correlation matrix calculating section outputting a node correlation matrix calculated from said transactions collected from each of said plurality of computers; an activity vector calculating section calculating an activity vector by solving an eigenequation specific to said node correlation matrix; and a fault detecting section providing a notification of a fault in a program being run through cooperation between said plurality of computers, depending on said activity vector.

(10) The anomaly detection system according to Item 9, wherein said service associated with said program and provided by each of said plurality of computers includes one or more items selected from a group including an IP address, a port number, and a transaction type.

(11) The anomaly detection system according to Item 10, comprising a fault detecting section detecting a fault at the application layer of said program by using a service associated with said program and provided by each of said plurality of computers, said service including one or more items selected from a group consisting of a source IP address, a destination IP address, a destination port number, and a transaction type at the destination port.

(12) The anomaly detection system according to Item 9, wherein said agent device is provided in each of said plurality of computers.

(13) The anomaly detection system according to Item 9, wherein said agent device is provided in a network device in said computer system.

(14) The anomaly detection system according to Item 9, wherein previously captured data about a transaction of each of said computers is used as data for calculating said node correlation matrix to determine the time point and service in which anomaly has occurred.

(15) An anomaly detection system monitoring a program for a fault on the basis of a probabilistic model to automatically detect a fault, said program being run through cooperation between computers in a computer system forming a network consisting of a plurality of computers, said anomaly detection system comprising: an agent module having transaction recording means for associating and recording transactions with a service, said transactions being processes of said service performed by each of said plurality of computers in response to a call from a program running on another of said plurality of computers; and an anomaly monitoring server connected to said network, comprising, transaction collecting means for collecting transactions recorded by said agent module from each of said plurality of computers; correlation matrix calculating means for outputting a node correlation matrix calculated from said transactions collected from each of said plurality of computers; activity vector calculating means for calculating an activity vector by solving an eigenequation specific to said node correlation matrix; probability estimating means for estimating the probability of occurrence of said activity vector; and fault detecting means for calculating an outlier measure of the activity vector from a probability density estimated by said probability estimating means to automatically detect a fault in the program being run through cooperation between said plurality of computers.

(16) The anomaly detection system according to Item 15, comprising fault detecting means for detecting a fault at the application layer of said program by using a service associated with said program and provided by each of said plurality of computers, said service including one or more items selected from a group including a source IP address, a destination IP address, a destination port number, and a transaction type at the destination port.

(17) The anomaly detection system according to Item 15, wherein said fault detecting means automatically detects a fault by transforming said activity vector into a cosine measure and calculating an outlier measure.

(18) The anomaly detection system according to Item 15, wherein said probability estimating means uses an online EM algorithm to learn a probability distribution online.

(19) An anomaly detection method for monitoring a program for a fault on the basis of a probabilistic model to automatically detect a fault, said program being run through cooperation between computers in a computer system forming a network consisting of a plurality of computers, said anomaly detection method comprising: a recording step performed by an agent module of associating and recording transactions with a service, said transactions being processes of said service performed by each of said plurality of computers in response to a call from a program running on another of said plurality of computers; and a step performed by an anomaly monitoring server connected to said network, comprising, a transaction collecting step of collecting transactions recorded by said agent, module from each of said plurality of computers; a correlation matrix calculating step of outputting a node correlation matrix calculated from said transactions collected from each of said plurality of computers; an activity vector calculating step of calculating an activity vector by solving an eigenequation specific to said node correlation matrix; a probability estimating step of estimating the probability of occurrence of said activity vector; and a fault detecting step of calculating an outlier measure of the activity vector from a probability density estimated in said probability estimating step to automatically detect a fault in the program being run through cooperation between said plurality of computers.

(20) The anomaly detection method according to Item 19, comprising a fault detecting step of detecting a fault at the application layer of said program by using a service associated with said program and provided by each of said plurality of computers, said service including one or more items selected from a group including a source IP address, a destination IP address, a destination port number, and a transaction type at the destination port.

(21) The anomaly detection method according to Item 19, wherein said fault detecting step automatically detects a fault by transforming said activity vector into a cosine measure and calculating an outlier measure.

(22) The anomaly detection method according to Item 19, wherein said probability estimating step uses an online EM algorithm to learn a probability distribution online.

(23) An anomaly detection program for monitoring a program for a fault on the basis of a probabilistic model to automatically detect a fault, said program being run through cooperation between computers in a computer system forming a network consisting of a plurality of computers, said anomaly detection program comprising: a recording step performed by an agent module of associating and recording transactions with a service, said transactions being processes of said service performed by each of said plurality of computers in response to a call from a program running on another of said plurality of computers; and a step performed by an anomaly monitoring server connected to said network, comprising, a transaction collecting step of collecting transactions recorded by said agent module from each of said plurality of computers; a correlation matrix calculating step of outputting a node correlation matrix calculated from said transactions collected from each of said plurality of computers; an activity vector calculating step of calculating an activity vector by solving an equation specific to said node correlation matrix; a probability estimating step of estimating the probability of occurrence of said activity vector; and a fault detecting step of calculating an outlier measure of the activity vector from a probability density estimated in said probability estimating step to automatically detect a fault in the program being run through cooperation between said plurality of computers.

(24) The anomaly detection program according to Item 23, comprising a fault detecting step of detecting a fault at the application layer of said program by using a service associated and provided with said program running on said plurality of computers, said service including one or more items selected from a group including a source IP address, a destination IP address, a destination port number, and a transaction type at the destination port.

(25) The anomaly detection program according to Item 23, wherein said fault detecting step automatically detects a fault by transforming said activity vector into a cosine measure and calculating an outlier measure.

(26) The anomaly detection program according to Item 23, wherein said probability estimating step uses an online EM algorithm to learn a probability distribution online.

(27) A storage medium on which the anomaly detection program according to Item 23 is stored.

(28) An anomaly monitoring server for monitoring a program for a fault on the basis of a probabilistic model to automatically detect a fault, said program being run through cooperation between computers in a computer system forming a network consisting of a plurality of computers, said anomaly monitoring server comprising: a transaction collecting section collecting transactions which are processes of a service performed by each of said plurality of computers in response to a call from a program running on another of said plurality of computers; a correlation matrix calculating section outputting a node correlation matrix calculated from said transactions collected from each of said plurality of computers; an activity vector calculating section calculating an activity vector by solving an eigenequation specific to said node correlation matrix; a probability estimating section estimating the probability of occurrence of said activity vector; and a fault detecting section calculating an outlier measure of the activity vector from a probability density estimated by said probability estimating section to automatically detect a fault in the program being run through cooperation between said plurality of computers.

Advantages of the invention include that if an anomaly occurs in an interaction between computers in which one program running on a computer calls a program running on another computer in a network system consisting of a plurality of computers, the anomaly can be detected automatically at runtime.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An anomaly detection system comprising means for monitoring a program for a fault on the basis of a probabilistic model to automatically detect a fault, said program being run through cooperation between computers in a computer system forming a network consisting of a plurality of computers, said anomaly detection system further comprising:

a plurality of computers providing services associated with said program;

an agent device associating and recording transactions with a service, said transactions being processes of said service performed by each of said plurality of computers in response to a call from a program running on another of said plurality of computers; and an anomaly monitoring server connected to said network, comprising, a transaction collecting section collecting transactions recorded by said agent device from each of said plurality of computers; a correlation matrix calculating section outputting a node correlation matrix calculated from said transactions collected from each of said plurality of computers; an activity vector calculating section calculating an activity vector by solving an eigenequation specific to said node correlation matrix; a probability estimating section estimating the probability of occurrence of said activity vector; and a fault detecting section calculating an outlier measure of the activity vector from a probability density estimated by said probability estimating section to automatically detect a fault in the program being run through cooperation between said plurality of computers.

2. The anomaly detection system according to claim 1, wherein said service associated with said program and provided by each of said plurality of computers includes one or more items selected from a group consisting of an IP address, a port number, and a transaction type.

3. The anomaly detection system according to claim 2, comprising a fault detecting section detecting a fault at the application layer of said program by using a service associated with said program and provided by each of said plurality of computers, said service including one or more items selected from a group including a source IP address, a destination IP address, a destination port number, and a transaction type at the destination port.

4. The anomaly detection system according to claim 1, wherein said fault detecting section automatically detects a fault by transforming said activity vector into a cosine measure and calculating an outlier measure.

5. The anomaly detection system according to claim 1, wherein said probability estimating section uses an online EM algorithm to learn a probability distribution online.

6. The anomaly detection system according to claim 1, wherein said agent device is provided in said plurality of computers.

7. The anomaly detection system according to claim 1, wherein said agent device is provided in a network device in said computer system.

8. The anomaly detection system according to claim 1, wherein previously captured data about a transaction of each of said computers is used as data for calculating said node correlation matrix to determine the time point and service in which anomaly has occurred.

9. An anomaly detection system for detecting a fault in a program being run through cooperation between computers in a computer system forming a network consisting of a plurality of computers, said anomaly detection system comprising:
a plurality of computers providing services associated with said program;
an agent device associating and recording transactions with a service, said transactions being processes of said service performed by each of said plurality of computers in response to a call from a program running on another of said plurality of computers; and
an anomaly monitoring server connected to said network, comprising, a transaction collecting section collecting transactions recorded by said agent device from each of said plurality of computers; a correlation matrix calculating section outputting a node correlation matrix calculated from said transactions collected from each of said plurality of computers; an activity vector calculating section calculating an activity vector by solving an eigenequation specific to said node correlation matrix; and a fault detecting section providing a notification of a fault in a program being run through cooperation between said plurality of computers, depending on said activity vector.

10. The anomaly detection system according to claim 9, wherein said service associated with said program and provided by each of said plurality of computers includes one or more items selected from a group including of an IP address, a port number, and a transaction type.

11. The anomaly detection system according to claim 10, comprising a fault detecting section detecting a fault at the application layer of said program by using a service associated with said program and provided by each of said plurality of computers, said service including one or more items selected from a group consisting of a source IP address, a destination IP address, a destination port number, and a transaction type at the destination port.

12. The anomaly detection system according to claim 9, wherein said agent device is provided in each of said plurality of computers.

13. The anomaly detection system according to claim 9, wherein said agent device is provided in a network device in said computer system.

14. The anomaly detection system according to claim 9, wherein previously captured data about a transaction of each of said computers is used as data for calculating said node correlation matrix to determine the time point and service in which anomaly has occurred.

15. An anomaly detection system comprising means for monitoring a program for a fault on the basis of a probabilistic model to automatically detect a fault, said program being run through cooperation between computers in a computer system forming a network consisting of a plurality of computers, said anomaly detection system further comprising:
an agent module having transaction recording means for associating and recording transactions with a service, said transactions being processes of said service performed by each of said plurality of computers in response to a call from a program running on another of said plurality of computers; and
an anomaly monitoring server connected to said network, comprising, transaction collecting means for collecting transactions recorded by said agent module from each of said plurality of computers; correlation matrix calculating means for outputting a node correlation matrix calculated from said transactions collected from each of said plurality of computers; activity vector calculating means for calculating an activity vector by solving an eigenequation specific to said node correlation matrix; probability estimating means for estimating the probability of occurrence of said activity vector; and fault detecting means for calculating an outlier measure of the activity vector from a probability density estimated by said probability estimating means to automatically detect a fault in the program being run through cooperation between said plurality of computers.

16. The anomaly detection system according to claim 15, comprising fault detecting means for detecting a fault at the application layer of said program by using a service associated with said program and provided by each of said plurality of computers, said service including one or more items selected from a group including a source IP address, a destination IP address, a destination port number, and a transaction type at the destination port.

17. The anomaly detection system according to claim 15, wherein said fault detecting means automatically detects a fault by transforming said activity vector into a cosine measure and calculating an outlier measure.

18. The anomaly detection system according to claim 15, wherein said probability estimating means uses an online EM algorithm to learn a probability distribution online.

19. An anomaly detection method comprising monitoring a program for a fault on the basis of a probabilistic model to automatically detect a fault, said program being run through cooperation between computers in a computer system forming a network consisting of a plurality of computers, said anomaly detection method further comprising:

a recording step performed by an agent module of associating and recording transactions with a service, said transactions being processes of said service performed by each of said plurality of computers in response to a call from a program running on another of said plurality of computers; and a step performed by an anomaly monitoring server connected to said network, comprising, a transaction collecting step of collecting transactions recorded by said agent, module from each of said plurality of computers; a correlation matrix calculating step of outputting a node correlation matrix calculated from said transactions collected from each of said plurality of computers; an activity vector calculating step of calculating an activity vector by solving an eigenequation specific to said node correlation matrix; a probability estimating step of estimating the probability of occurrence of said activity vector; and a fault detecting step of calculating an outlier measure of the activity vector from a probability density estimated in said probability estimating step to automatically detect a fault in the program being run through cooperation between said plurality of computers.

20. The anomaly detection method according to claim 19, comprising a fault detecting step of detecting a fault at the application layer of said program by using a service associated with said program and provided by each of said plurality of computers, said service including one or more items selected from a group including a source IP address, a destination IP address, a destination port number, and a transaction type at the destination port.

21. The anomaly detection method according to claim 19, wherein said fault detecting step automatically detects a fault by transforming said activity vector into a cosine measure and calculating an outlier measure.

22. The anomaly detection method according to claim 19, wherein said probability estimating step uses an online EM algorithm to learn a probability distribution online.

23. An anomaly monitoring server for monitoring a program for a fault on the basis of a probabilistic model to automatically detect a fault, said program being run through cooperation between computers in a computer system forming a network consisting of a plurality of computers, said anomaly monitoring server comprising:

a transaction collecting section collecting transactions which are processes of a service performed by each of said plurality of computers in response to a call from a program running on another of said plurality of computers;

a correlation matrix calculating section outputting a node correlation matrix calculated from said transactions collected from each of said plurality of computers; an activity vector calculating section calculating an activity vector by solving an eigenequation specific to said node correlation matrix;

a probability estimating section estimating the probability of occurrence of said activity vector; and a fault detecting section calculating an outlier measure of the activity vector from a probability density estimated by said probability estimating section to automatically detect a fault in the program being run through cooperation between said plurality of computers.

24. An article of manufacture comprising a computer usable medium having computer readable program code means embodied therein for causing anomaly detection, the computer readable program code means in said article of manufacture comprising computer readable program code means for causing a computer to effect the steps of claim 19.

25. A program storage device readable by machine, tangibly embodying a program of instructions executable by the machine to perform method steps for anomaly detection, said method steps comprising the steps of claim 19.

26. A computer program product comprising a computer usable medium having computer readable program code means embodied therein for causing anomaly detection, the computer readable program code means in said computer program product comprising computer readable program code means for causing a computer to effect the functions of claim 1.

27. A computer program product comprising a computer usable medium having computer readable program code means embodied therein for causing anomaly detection, the computer readable program code means in said computer program product comprising computer readable program code means for causing a computer to effect the functions of claim 9.

28. A computer program product comprising a computer usable medium having computer readable program code means embodied therein for causing anomaly detection, the computer readable program code means in said computer program product comprising computer readable program code means for causing a computer to effect the functions of claim 15.

* * * * *